US008635973B1

(12) United States Patent
Shepard, III

(10) Patent No.: US 8,635,973 B1
(45) Date of Patent: Jan. 28, 2014

(54) ARTIFICIAL MANGROVE ASSEMBLY

(71) Applicant: Lee C. Shepard, III, Lantana, FL (US)

(72) Inventor: Lee C. Shepard, III, Lantana, FL (US)

(*) Notice: Subject to any disclaimer, the term of this patent is extended or adjusted under 35 U.S.C. 154(b) by 0 days.

(21) Appl. No.: 13/656,214

(22) Filed: Oct. 19, 2012

(51) Int. Cl.
*A01K 61/00* (2006.01)

(52) U.S. Cl.
USPC .......................................... 119/221; 119/207

(58) Field of Classification Search
USPC ......... 119/221, 223, 224, 225, 238, 239, 207, 119/208, 209; 47/64, 70, 83
See application file for complete search history.

(56) References Cited

U.S. PATENT DOCUMENTS

| 3,738,318 | A | * | 6/1973 | Woodbridge et al. ......... 119/238 |
| 3,898,958 | A | | 8/1975 | Pranis, Jr. |
| 4,196,694 | A | * | 4/1980 | Buchanan ..................... 119/222 |
| 4,388,019 | A | | 6/1983 | Kajihara |
| 4,487,588 | A | * | 12/1984 | Lewis et al. ..................... 441/43 |
| 4,993,362 | A | | 2/1991 | Jimbo |
| 5,109,796 | A | * | 5/1992 | Monus ........................... 119/221 |
| 5,669,330 | A | | 9/1997 | O'Hare |
| 5,700,108 | A | * | 12/1997 | Bishop et al. ................... 405/26 |
| 6,089,191 | A | * | 7/2000 | Calinski et al. ............... 119/221 |
| 6,234,715 | B1 | * | 5/2001 | Ono ................................ 405/29 |
| 6,523,497 | B2 | | 2/2003 | Smith |
| 6,824,327 | B1 | * | 11/2004 | Walter ........................... 405/33 |
| 6,978,735 | B1 | * | 12/2005 | Yeager ......................... 119/221 |
| 7,048,474 | B2 | * | 5/2006 | Tabler ....................... 405/302.7 |
| D607,081 | S | | 12/2009 | Harper et al. |
| D607,082 | S | | 12/2009 | Harper et al. |
| D625,471 | S | * | 10/2010 | King ............................. D30/106 |
| 7,828,493 | B1 | | 11/2010 | Brignac |
| 8,033,250 | B2 | * | 10/2011 | Calinski ....................... 119/208 |
| 2002/0119006 | A1 | * | 8/2002 | Moore ............................. 405/33 |
| 2002/0168229 | A1 | * | 11/2002 | Utter et al. ....................... 405/23 |
| 2003/0000480 | A1 | * | 1/2003 | Jenkins ........................ 119/221 |
| 2004/0168649 | A1 | | 9/2004 | Harper et al. |
| 2005/0229863 | A1 | | 10/2005 | Harper et al. |
| 2011/0017144 | A1 | | 1/2011 | Calinski |

FOREIGN PATENT DOCUMENTS

| JP | 8289694 | 11/1996 |
| JP | 11127719 | 5/1999 |
| JP | 2005034004 | 2/2005 |
| JP | 2006336404 | 12/2006 |

* cited by examiner

*Primary Examiner* — Yvonne Abbott
(74) *Attorney, Agent, or Firm* — Simpson & Simpson, PLLC

(57) ABSTRACT

An artificial mangrove assembly, including: a mounting assembly for attachment to a surface at least partially submerged in a body of water; and respective pluralities of first and second root elements. Each first root element is fixedly secured to the mounting assembly at a respective first connection point, extends downward in a first direction from the respective first connection point, and includes a respective first distal end arranged to contact a bottom of the body of water. Each second root element is fixedly secured to a respective first root element at a respective second connection point and includes: a respective first portion extending downward in the first direction with respect to the respective second connection point; a respective second portion extending outward with respect to the respective second connection point in the second direction; and a respective second distal end arranged to contact the bottom of the body of water.

20 Claims, 7 Drawing Sheets

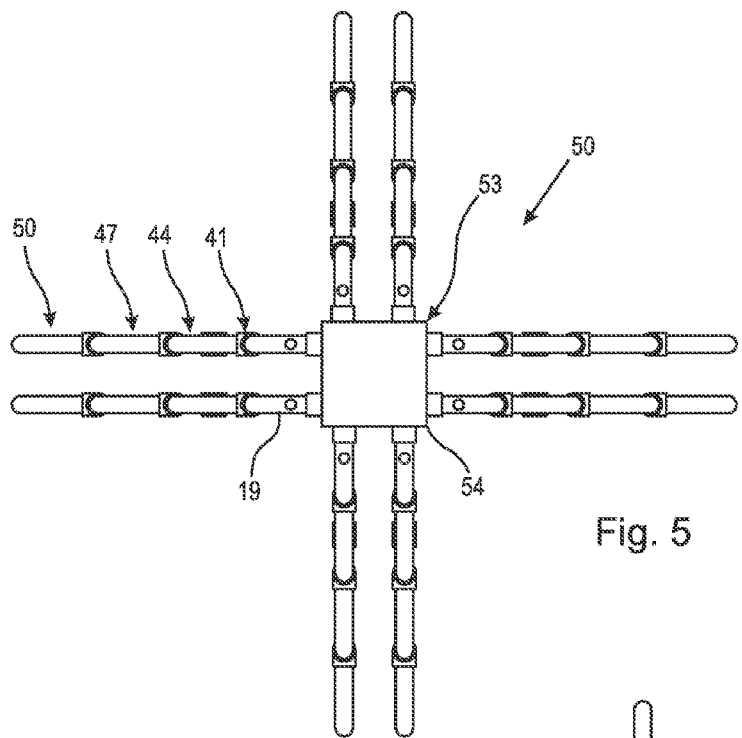
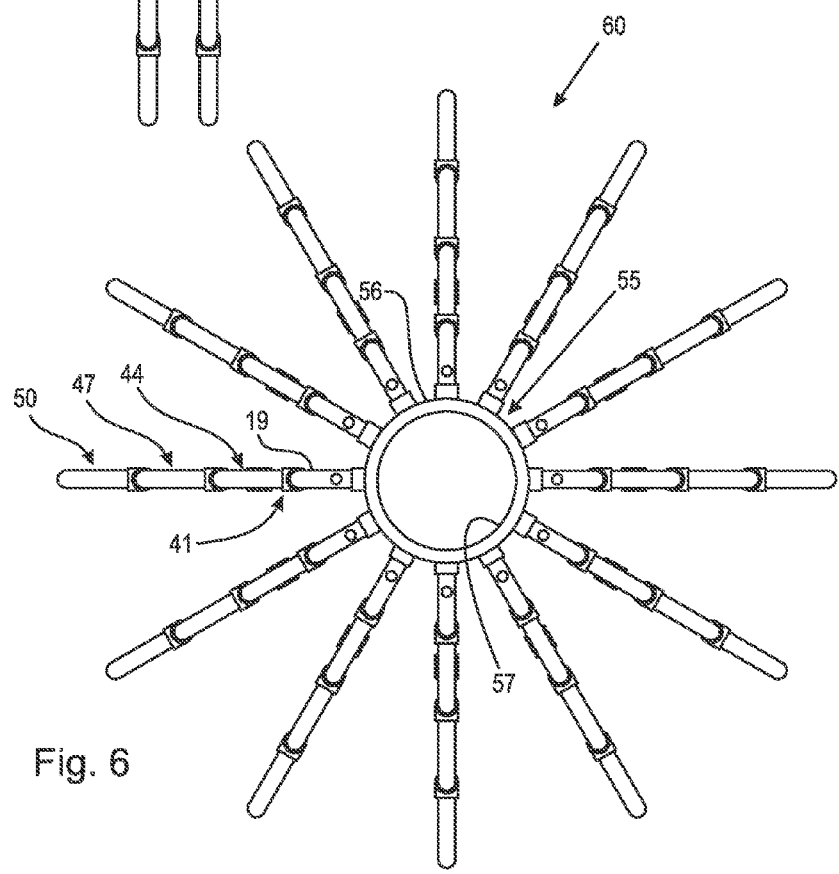

ARTIFICIAL MANGROVE ASSEMBLY

FIELD OF THE INVENTION

The present disclosure broadly relates to an artificial underwater ecosystem assembly, and, more particularly, to an artificial mangrove assembly to provide habitat for flora and fauna and reduce the impact of high-energy wave action on coastal areas.

BACKGROUND OF THE INVENTION

Natural mangroves are a type of ecosystem made of various kinds of trees that grow in saline coastal sediment habitats in the tropics and subtropics. Broadly, the term "mangrove" refers to the entire plant assemblage, or mangal, found by depositional coastal environments. The roots of the mangrove provide habitat for marine flora and fauna, such as fish, crustaceans, and birds. Moreover, the roots act as a substrate for marine life colonization, and trap aquatic nutrients for marine life. Naturally occurring mangroves are rapidly disappearing for a number of reasons including climate change, barnacle infestation, weeds, pollution, logging, oil exploration and extraction, shrimp agriculture, tourism, and urban development. Urban developers clear mangrove forests to make room for boats and industrial, commercial, and residential areas. The disappearance of mangroves, or deforestation, contributes to declines in fisheries, threats to bird species, erosion and land subsidence, degradation of clean water, salinization of coastal soils, and the release of carbon dioxide into the atmosphere.

Dock pilings and other structures along the coastline provide inadequate protection for marine life from predators. Coastal structures, like seawalls, stabilize adjacent soil. U.S. Pat. No. 5,669,330 (O'Hare) discloses a synthetic habitat device comprising a horizontal member and a plurality of cylindrical downward curving appendages. The device is permanently attached to existing bulkhead structures bordering an aquatic system and is located adjacent to and below the surface of the water. The synthetic habitat device is problematic because the device provides only a limited amount of shelter space for marine life. Once the first-to-arrive species occupy the device, other species remain unprotected. Similarly, the device provides only a limited amount of surface area for colonizing aquatic life.

BRIEF SUMMARY OF THE INVENTION

According to aspects illustrated herein, there is provided an artificial mangrove assembly for providing a habitat for aquatic organisms, including: a mounting assembly arranged for attachment to a surface at least partially submerged in a body of water; and respective pluralities of first and second root elements. Each first root element is fixedly secured to the mounting assembly at a respective first connection point, extends downward in a first direction from the respective first connection point, and includes a respective first distal end arranged to contact a bottom of the body of water. Each second root element is fixedly secured to a respective first root element at a respective second connection point and includes: a respective first portion extending downward in the first direction with respect to the respective second connection point; a respective second portion extending outward with respect to the respective second connection point in the second direction; and a respective second distal end arranged to contact the bottom of the body of water.

According to aspects illustrated herein, there is provided an artificial mangrove assembly for providing a habitat for aquatic organisms, including: a mounting assembly arranged for attachment to a surface at least partially submerged in a body of water and respective pluralities of first, second, and third root elements. Each first tubular root element is fixedly secured to the mounting assembly at a respective first connection point, extends downward in a first direction from the respective first connection point, and includes a respective first distal end arranged to contact a bottom of the body of water. Each second tubular root element is fixedly secured to a respective first tubular root element at a respective second connection point and includes: a respective first portion extending downward in the first direction with respect to the respective second connection point; a respective second portion extending outward with respect to the respective second connection point in the second direction; and a respective second distal end arranged to contact the bottom of the body of water. Each third tubular root element is fixedly secured to a respective second tubular root element at a respective third connection point and includes: a respective third portion extending downward in the first direction with respect to the respective third connection point; a respective fourth portion extending outward with respect to the respective third connection point in the second direction; and a respective third distal end arranged to contact the bottom of the body of water. The plurality of second root elements includes first and second groups of second root elements. Respective second connection points for the first group are further from the mounting assembly in the first direction than respective second connection points for the second group. The plurality of third root elements includes third and fourth groups of third root elements. Respective third connection points for the third group are further from the mounting assembly in the first direction than respective third connection points for the fourth group.

According to aspects illustrated herein, there is provided a method of forming an artificial mangrove assembly for providing a habitat for aquatic organisms, including: attaching a mounting assembly to a surface at least partially submerged in a body of water; and fixedly securing each first root element from a plurality of first root elements to the mounting assembly at a respective first connection point such that: said each first root element extends downward in a first direction from the respective first connection point; and a respective first distal end for said each first root element contacts a bottom of the body of water. The method includes fixedly securing each second root element from a plurality of second root elements to a respective first root element at a respective second connection point such that: a respective first portion extends downward in the first direction with respect to the respective second connection point; a respective second portion extends outward with respect to the respective second connection point in the second direction; and a respective second distal contacts the bottom of the body of water.

BRIEF DESCRIPTION OF THE DRAWINGS

The nature and mode of operation of the present invention will now be more fully described in the following detailed description of the invention taken with the accompanying drawing figures, in which:

FIG. 5 is plan view of an artificial mangrove assembly fixedly secured to a rectangular pillar; and, FIG. 6 is plan view of an artificial mangrove assembly fixedly secured to a cylindrical pillar.

DETAILED DESCRIPTION OF THE INVENTION

At the outset, it should be appreciated that like drawing numbers on different drawing views identify identical, or functionally similar, structural root elements of the invention. Moreover, although any methods, devices or materials similar or equivalent to those described herein can be used in the practice or testing of these embodiments, some embodiments of methods, devices, and materials are now described.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. Although any methods, devices or materials similar or equivalent to those described herein can be used in the practice or testing of the invention, the preferred methods, devices, and materials are now described.

Figure 1:
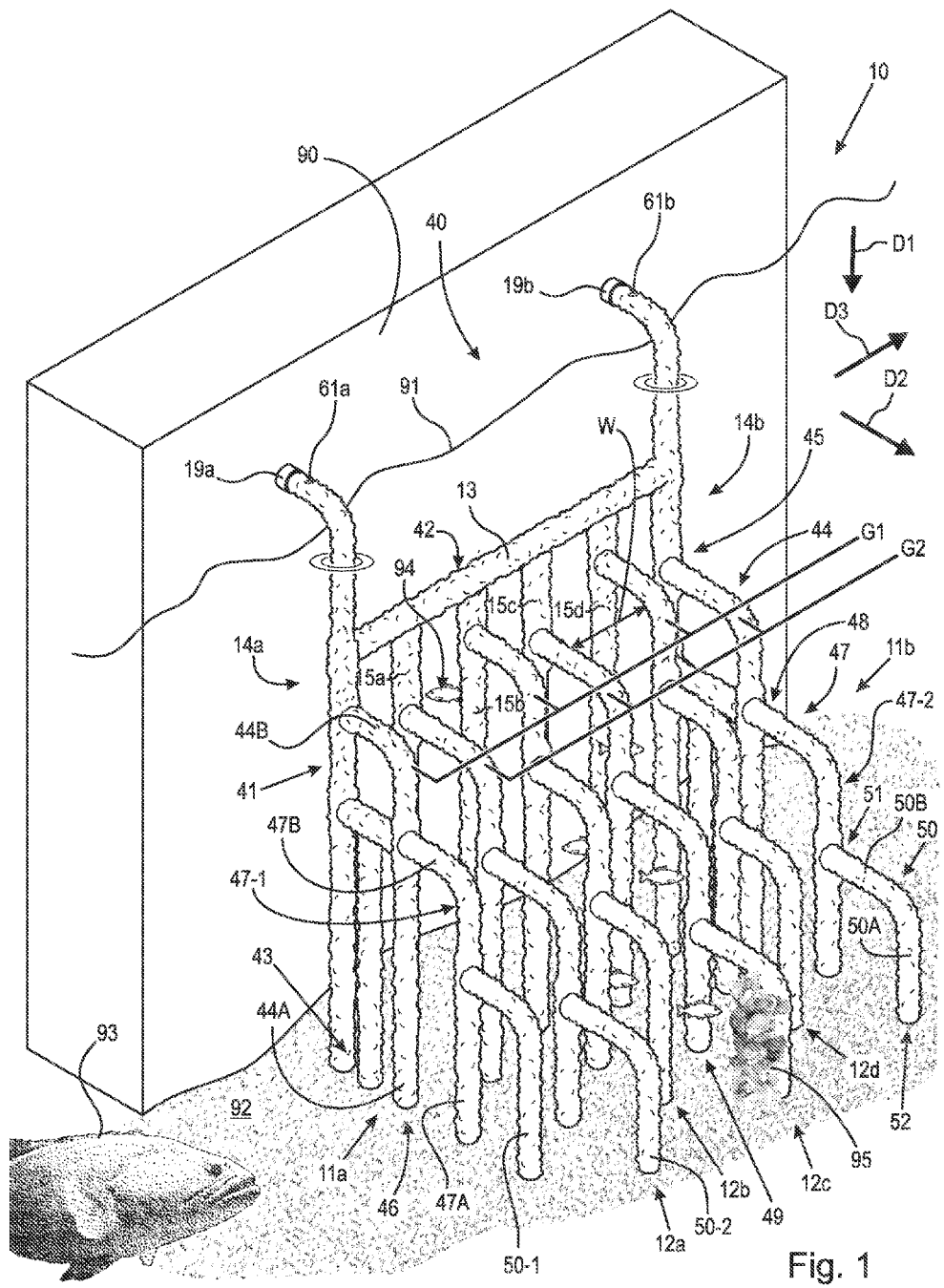
FIG. 1 is a front perspective view of an artificial mangrove assembly, having pluralities of root elements coated in an aggregate mixture, shown submerged underwater and secured to a seawall.

FIG. 1 is a front perspective view of an artificial mangrove assembly, having pluralities of root elements, shown submerged underwater and secured to a seawall.

Figure 2:
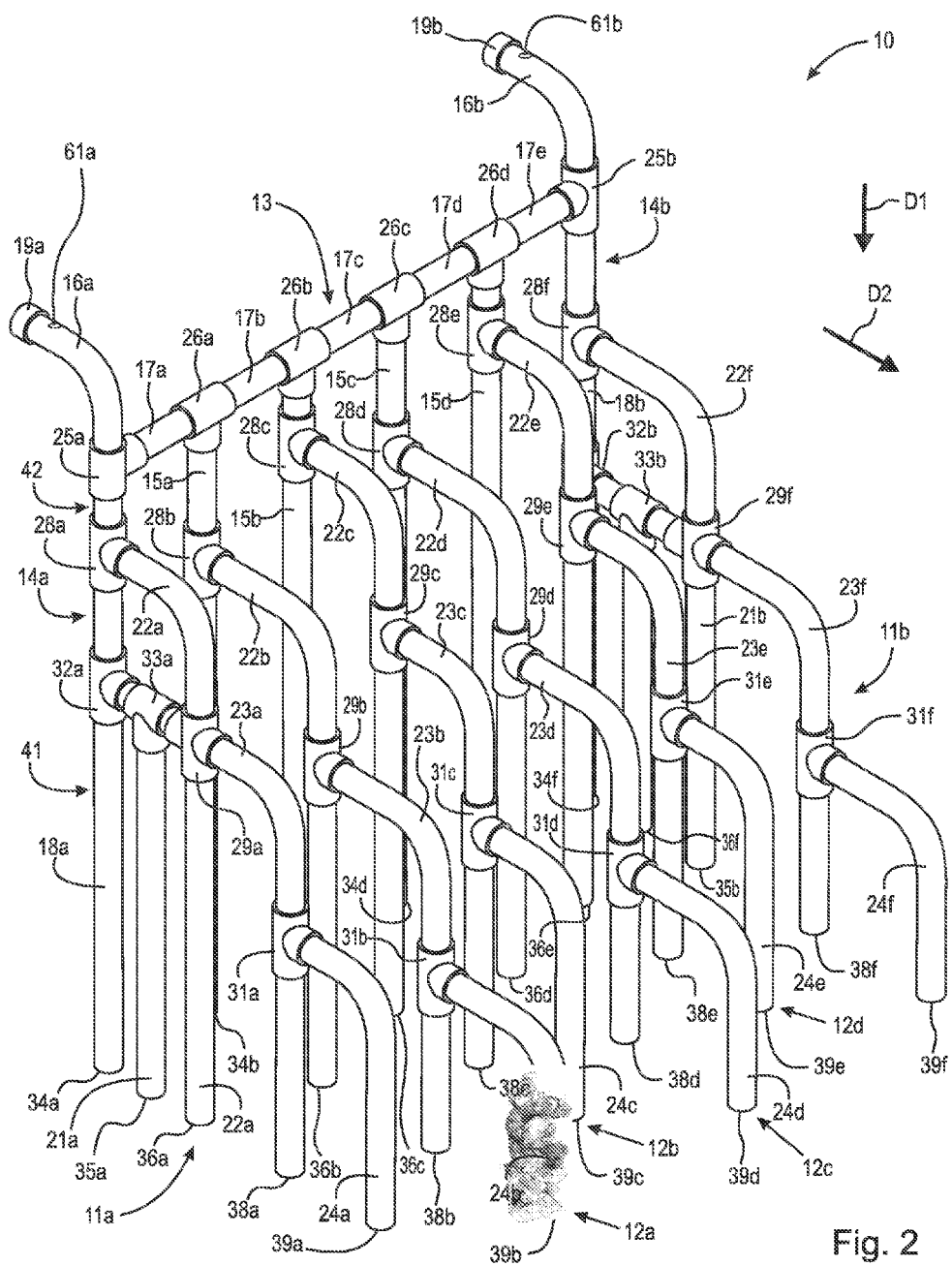
FIG. 2 is a front perspective view of the artificial mangrove assembly of FIG. 1, with the aggregate mixture removed.

FIG. 2 is a front perspective view of the artificial mangrove assembly of FIG. 1, with the aggregate mixture removed.

Figure 3:
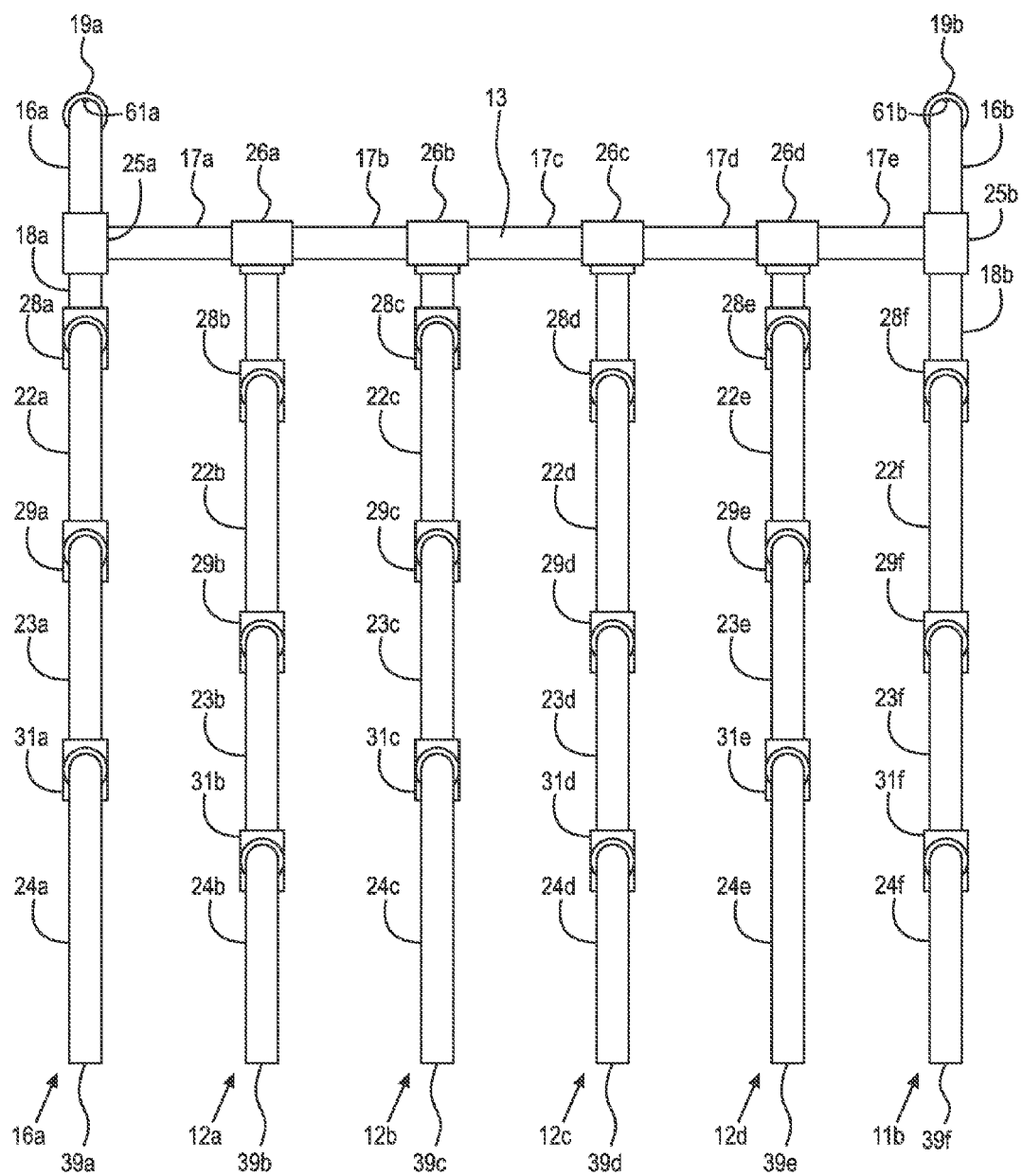
FIG. 3 is a front elevation view of the artificial mangrove assembly of FIG. 1.

FIG. 3 is a front elevation view of the artificial mangrove assembly of FIG. 1.

Figure 4:
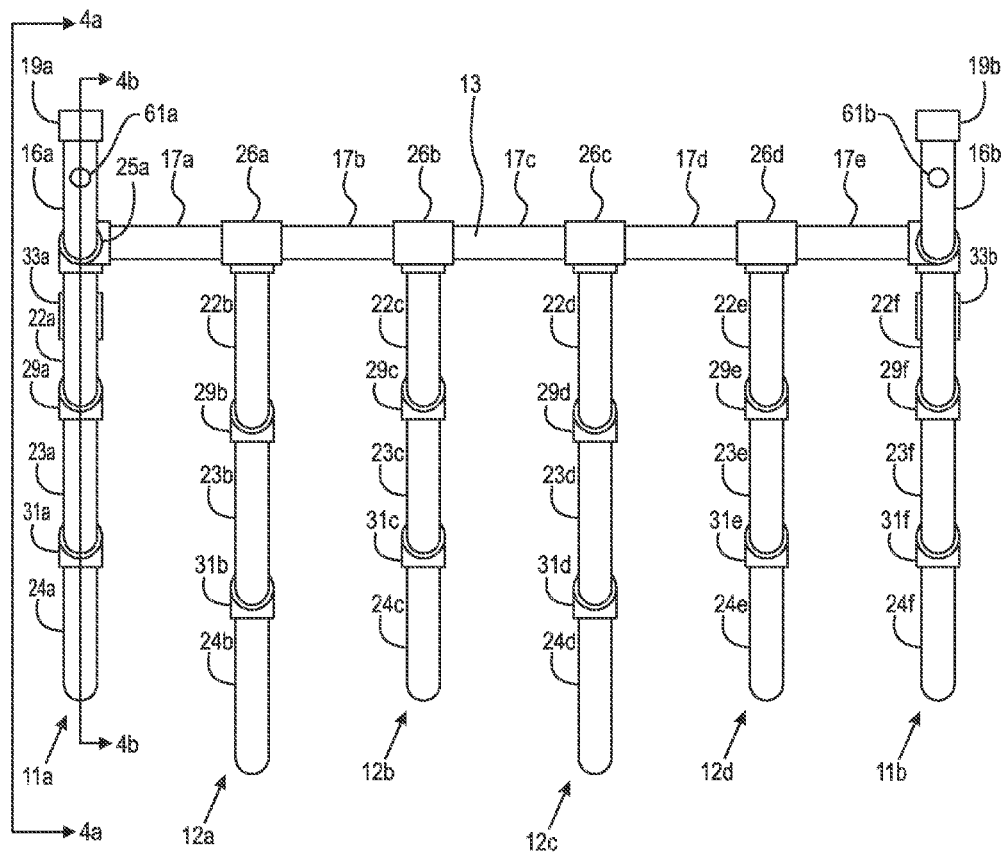
FIG. 4 is a top plan view of the artificial mangrove assembly of FIG. 1.
Figure 4A:
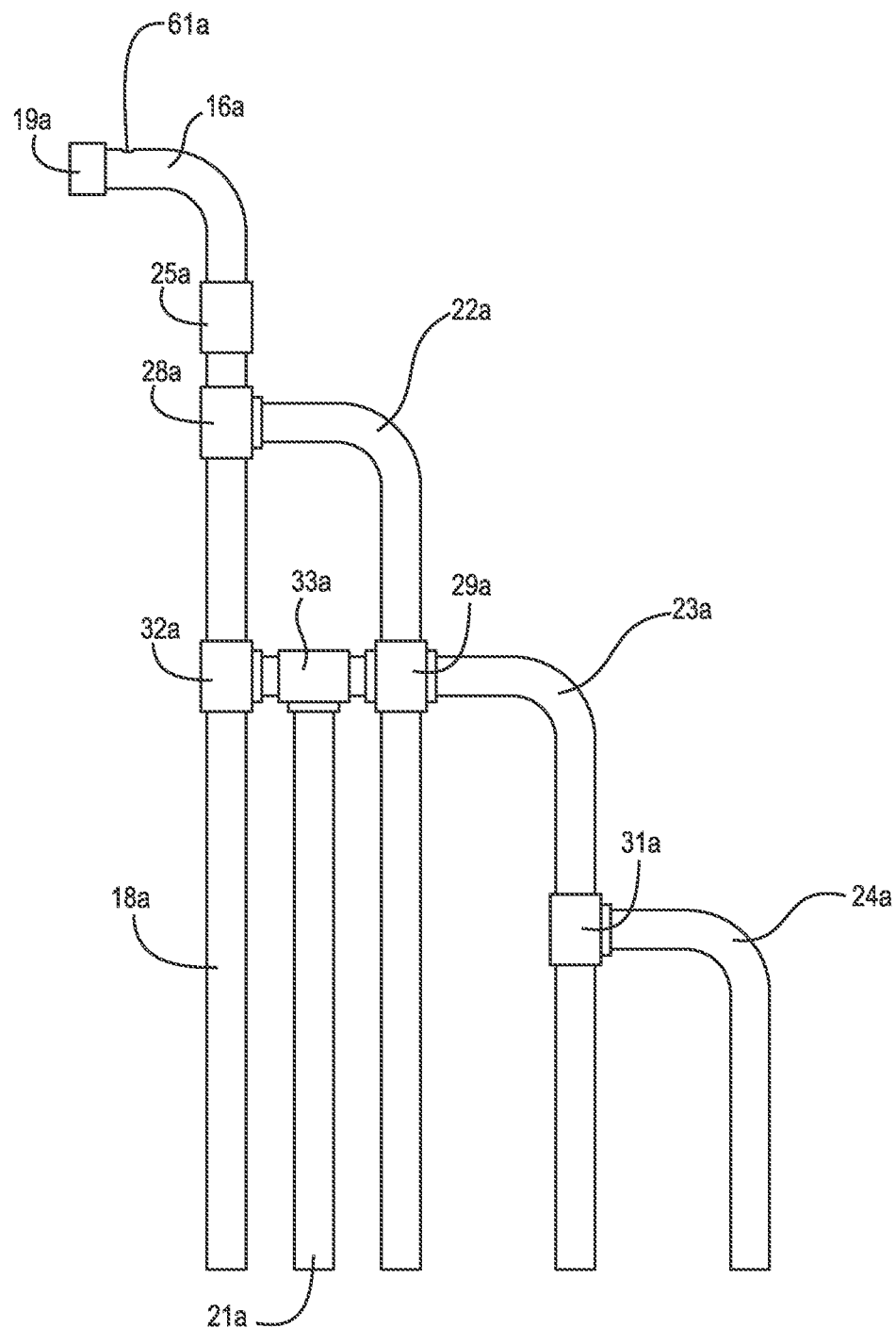
FIG. 4a is a cross-sectional view taken generally along line 4A-4A of FIG. 4.
Figure 4B:
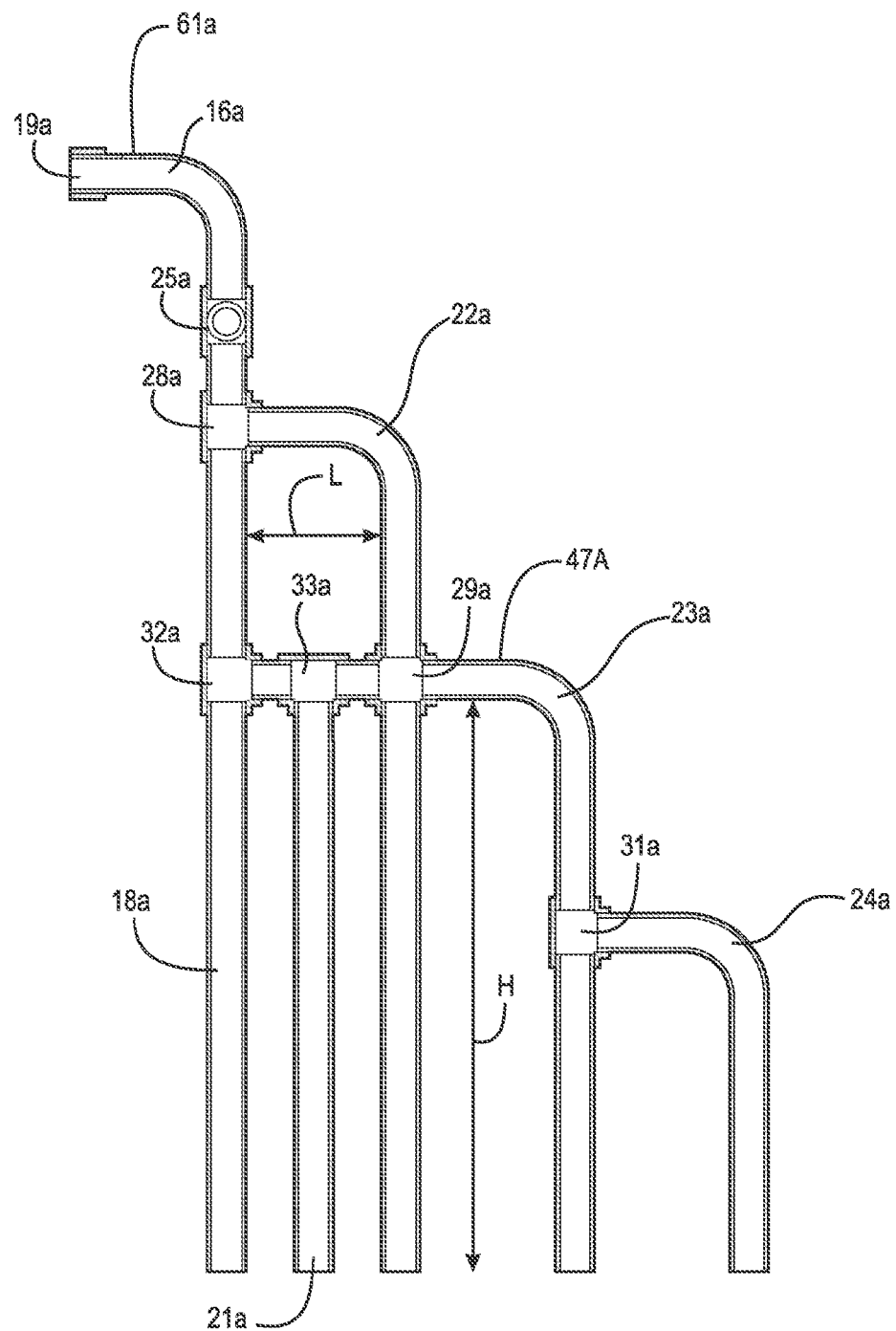
FIG. 4b is a cross-sectional view taken generally along line 4B-4B of FIG. 4.

FIG. 4 is a top plan view of the artificial mangrove assembly of FIG. 1. The following should be viewed in light of FIGS. 1 through 4. Assembly 10 includes mounting assembly 40 arranged for attachment to a surface at least partially submerged in a body of water, for example, seawall 90 partially submerged in body of water 91. Assembly 10 includes a plurality of root elements 41, each element 41 fixedly secured to the mounting assembly at a respective connection point 42 and extending downward in direction D1 from the respective connection point 41. The term "root element" is used in the present disclosure because the elements mimic roots in a mangrove ecosystem. Each element 41 includes distal end 43 arranged to contact bottom 92 of the body of water.

Assembly 10 includes a plurality of root elements 44. Each element 44 is fixedly secured to a respective element 41 at a respective connection point 45. Each element 44 includes portion 44A extending downward in direction D1 with respect to connection point 45 and a portion 44B extending outward from connection point 45 in direction D2 orthogonal to D1. Each element 44 includes distal end 46 arranged to contact bottom 92.

In an example embodiment, the mounting assembly is arranged for attachment to a planar substantially vertical surface such as seawall 90. In an example embodiment, the mounting assembly includes straight mounting element 13 and at least one connection element 19 for connecting the straight mounting element to the substantially vertical surface. Element 19 positions element 13 away from the substantially vertical surface in direction D2. Connection points 42 are spaced apart along the straight mounting element. In an example embodiment, connection points 42 are evenly spaced along element 13.

In an example embodiment, connection points 45 are further in direction D1, with respect to the mounting assembly, than connection points 42. In an example embodiment, root elements 41 are tubular and are aligned in direction D3 orthogonal to D1 and D2. By "tubular" we mean that the elements have elongated shapes. The shapes can be circular in cross-section or can include other shapes in cross-section. In an example embodiment, tubular elements are hollow. In an example embodiment, root elements 44 are tubular and include groups G1 and G2 of root elements 44. Elements 44 in G1 are aligned in direction D3 orthogonal to D1 and D2. Elements 44 in G2 are aligned in direction D3 and at least partially misaligned with elements 44 in G1 in direction D3. In an example embodiment, connection points for elements 44 in G1 are closer to the mounting assembly in direction D1 than connections points for elements 44 in G2. In an example embodiment, portions 44A for elements 44 in G1 are further from the mounting assembly in direction D2 than portions 44A for elements 44 in G2. Thus, a staggered arrangement is created.

In an example embodiment, the assembly includes additional pluralities of root elements, for example elements 47. Each element 47 is fixedly secured to a respective element 44 at a respective connection point 48. Each element 47 includes portion 47A extending downward in direction D1 with respect to connection point 48 and portion 47B extending outward from connection point 48 in direction D2. Each element 47 includes distal end 49 arranged to contact bottom 92. In an example embodiment, the assembly includes a plurality of root elements 50. Each element 50 is fixedly secured to a respective element 47 at a respective connection point 51. Each element 50 includes portion 50A extending downward in direction D1 with respect to connection point 51 and portion 50B extending outward from connection point 51 in direction D2. Each element 50 includes distal end 52 arranged to contact bottom 92.

In an example embodiment, connection points 48 are further in direction D1, with respect to the mounting assembly, than connection points 45. In an example embodiment, root elements 47 are tubular and are aligned in direction D3 orthogonal to D1 and D2. In an example embodiment, connection points 51 are further in direction D1, with respect to the mounting assembly, than connection points 48. In an example embodiment, root elements 50 are tubular and are aligned in direction D3 orthogonal to D1 and D2.

The discussion regarding elements 44 and groups G1 and G2 is applicable to elements 47 and 50. For example, portion 47A for element 47-1 is further in direction D2, with respect to the mounting assembly, than portion 47A for element 47-2.

For example, connection point 51 for element 50-1 is closer to the mounting assembly in direction D1 than connection point 51 of element 50-2.

FIG. 5 is plan view of artificial mangrove assembly 50 fixedly secured to rectangular pillar 53. In an example embodiment, assembly 50 includes root elements 41, 44, 47, and 50 and the discussion above regarding root elements 41, 44, 47, and 50 is applicable to assembly 50 except as noted. In an example embodiment, the mounting assembly does not include element 13. For example, as shown in FIG. 5, there are only two each of elements 41, 44, 47, and 50 extending from each wall 54 of the pillar.

FIG. 6 is plan view of artificial mangrove assembly 60 fixedly secured to cylindrical pillar 55. In an example embodiment, the mounting assembly includes curved mounting element 56 arranged to connect to a curved surface, such as wall 57 of the pillar. In an example embodiment, element 56 is a stainless steel band. In an example embodiment, assembly 60 includes root elements 41, 44, 47, and 50 and the discussion above regarding root elements 41, 44, 47, and 50 is applicable to assembly 60 except as noted. In an example embodiment, elements 19 are directly connected to wall 57 without use of element 56.

It should be understood that assemblies 10, 50, and 60 are not limited to respective particular number of pluralities of root elements and that numbers of root elements, other than those shown in the figures of the present disclosure, are possible.

It should be understood that assembly 40 and elements 13 can be mounted to a surface by any means known in the art, including, but not limited to marine adhesive or fasteners partially implanted in the surface.

The following should be viewed in light of FIGS. 1 through 6. The following discussion in directed to assembly 10; however, it should be understood that the discussion is applicable to assemblies 50 and 60 as well. Advantageously, assembly 10 addresses the problems noted above resulting from the loss of natural mangroves ecosystems. The root elements, such as elements 41, 44, 47, and 50, simulate the structure and spacing of roots in a mangrove ecosystem, providing shelter and habitat for marine flora and fauna. Moreover, the root elements act as a substrate for marine life colonization, and trap aquatic nutrients for the fish and other marine life. As shown in FIG. 1, smaller fish, such as juvenile and fish fry 94, are able to hide throughout the root elements while being protected from larger apex predators, such as grouper 93. Further, assembly 10 advantageously attenuates high-energy wave action, since the wave action is broken up and dissipated by the various root elements.

Spacing W between respective elements 41, 44, 47, and 50 is adjustable to meet the requirements of a particular application or to attain desired results. Spacing W can be varied for elements 41, that is, spacing W does not need to be the same between each pair of adjacent elements 41.

Height H for horizontal portions of respective elements 41, 44, 47, and 50 (for example, portions 47B) are adjustable to meet the requirements or attain the desired results noted above. It should be understood that H can vary for respective sets of elements 44, 47, and 50. That is, H does not need to be the same for every element in same set of elements, for example, as described above groups G1 and G2. Length L between the vertical surface and respective elements 41, 44, 47, and 50 or between respective elements 41, 44, 47, and 50, also is adjustable to meet the requirements or attain the desired results noted above. L does not need to be the same for every element in same set of elements, for example, as described above groups G1 and G2. In an example embodiment, a root element attached to another root element is pivotable such that horizontal portions of the two root elements are not aligned in D2. For example, elements 50 can be pivoted with respect to elements 47.

By selecting and varying W, L, and H, a complex staggered arrangement of root elements can be formed which mimics the complexity of a root system for a natural mangrove ecosystem. The complex staggered arrangement results in spaces of varying widths, lengths, and heights being formed, which provide desirable habitat for flora and fauna and enhance resistance to undesirable wave action. For example, there are minimal "clear spaces" extending through the entirety of the assembly due to the offsets of root elements and spaces. For example, staggering respective positions of the roots by varying W, H and/or L confuses apex predators, further enhancing survival of marine life sheltering in the assembly. The respective distal ends of the various root elements can be established to accommodate a slope or other topographical features of bed 92.

The following provides further example detail regarding assemblies 10, 50, and 60. In an example embodiment, artificial mangrove assembly 10 generally includes at least two support members 14a, 14b, means 19a, 19b for mounting at least two support members 14a, 14b to seawall 90, support rod 13, plurality of ancillary support members 15a, 15b, 15c, 15d, and plurality of roots 11a, 11b, 12a, 12b, 12c, 12d. Additionally, support members 14a, 14b include apertures 61a, 61b, respectively. These apertures function to equalize hydraulic pressure when the assembly is submerged.

FIG. 2 is a front perspective view of artificial mangrove assembly 10. In an example embodiment, support rod 13 has first end 25a and second end 25b, where first end 25a is secured to and substantially perpendicular to support member 14a and second end 25b is secured to and disposed substantially perpendicular to support member 14b, such that support rod 13 is disposed horizontally between support members 14a, 14b. Additionally, each ancillary support member 15a, 15b, 15c, 15d extends downwardly from the support rod and each root 11a, 11b, 12a, 12b, 12c, 12d is secured to a corresponding ancillary support member 15a, 15b, 15c, 15d and extends outwardly therefrom.

In an example embodiment, each at least partially curved root element includes three respective segments that extend outwardly and downwardly to form a substantially right angle. For example, such that the first segment extends outwardly and downwardly from the ancillary support member, the second segment extends outwardly and downwardly from the first segment, and the third segment extends outwardly and downwardly from the second segment. For example, root group 11a includes three segments 22a, 23a, 24a, that extend outwardly and downwardly to form a substantially right angle, such that first segment 22a extends outwardly and downwardly from 14a ancillary support member, second segment 23a, extends outwardly and downwardly from first segment 22a, and third segment 24a extends outwardly and downwardly from second segment 23a.

For example, root group 11b includes three segments 22f, 23f, 24f, that extend outwardly and downwardly to form a substantially right angle, such that first segment 22f extends outwardly and downwardly from 14b ancillary support member, second segment 23f, extends outwardly and downwardly from first segment 22f, and third segment 24f extends outwardly and downwardly from second segment 23f. For example, root group 12a includes three segments 22b, 23b, 24b, that extend outwardly and downwardly to form a substantially right angle, such that first segment 22b extends outwardly and downwardly from 15a ancillary support member, second segment 23b, extends outwardly and downwardly from first segment 22b, and third segment 24b extends outwardly and downwardly from second segment 23b. For example, root group 12b includes three segments 22c, 23c, 24c, that extend outwardly and downwardly to form a substantially right angle, such that first segment 22c extends outwardly and downwardly from 15b ancillary support member, second segment 23c, extends outwardly and downwardly from first segment 22c, and third segment 24c extends outwardly and downwardly from second segment 23c.

For example, root group 12c includes three segments 22d, 23d, 24d, that extend outwardly and downwardly to form a substantially right angle, such that first segment 22d extends outwardly and downwardly from 15c ancillary support member, second segment 23d, extends outwardly and downwardly from first segment 22d, and third segment 24d extends outwardly and downwardly from second segment 23d. For example, root group 12d includes three segments 22e, 23e, 24e, that extend outwardly and downwardly to form a substantially right angle, such that first segment 22e extends outwardly and downwardly from 15d ancillary support member, second segment 23e, extends outwardly and downwardly from first segment 22e, and third segment 24e extends outwardly and downwardly from second segment 23e.

Element 21a further hinder access of apex predators by restricting openings to the interior of the assembly or movement through the interior. Element 21a can be located between elements 44 and 47 and/or elements 47 and 50. Element 21a can be located at the periphery of the assembly and/or within the interior of the assembly, for example, connected to segment 22b or 23c.

Assemblies 10, 50, and 60 can be made of any suitable material known in the art, including, but not limited to plastic, such as polyvinyl chloride (PVC). However, it should be appreciated that the artificial mangrove assemblies can be made of any suitable material. As shown in FIG. 1, in an example embodiment, assembly 10 is coated in an aggregate mixture to attract organisms, such as oyster clutch 95. The aggregate mixture is beneficial because one oyster can filter up to 1.3 gallons of water per hour. Moreover, as generations of oysters settle and attach to assembly 10, they aid in providing a structured habitat for many fish species and crabs. Preferably, the aggregate mixture is similar in pH to seawater and in the range of approximately 7.5 to 8.4. Additionally, the aggregate mixture includes oyster shell particles for texture. However, it should be noted that the aggregate mixture can be any suitable pH and be made of any suitable material. In an example embodiment, after the aggregate mixture is applied, assembly 10 is coated in a low volatile organic compound (VOC) paint, which also aids to protect the assembly from ultraviolet light and other elements.

Although examples of root elements have been depicted as curved and straight segments, it should be understood that other configurations, such as angled straight segments are possible.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. An artificial mangrove assembly for providing a habitat for aquatic organisms, comprising:
    a mounting assembly arranged for attachment to a surface at least partially submerged in a body of water;
    a plurality of first root elements, each first root element:
        fixedly secured to the mounting assembly at a respective first connection point;
        extending downward in a first direction from the respective first connection point; and,
        including a respective first distal end arranged to contact a bottom of the body of water; and,
    a plurality of second root elements, each second root element fixedly secured to a respective first root element at a respective second connection point and including:
        a respective first portion extending downward in the first direction with respect to the respective second connection point;
        a respective second portion extending outward with respect to the respective second connection point in the second direction; and,
        a respective second distal end arranged to contact the bottom of the body of water.

2. The artificial mangrove assembly of claim 1, wherein the mounting assembly is arranged for attachment to a planar substantially vertical surface; or a curved substantially vertical surface.

3. The artificial mangrove assembly of claim 1, wherein:
    the mounting assembly includes:
        a straight mounting element; and,
        at least one connection element for connecting the straight mounting element to the surface and positioning the straight mounting element away from the surface in the second direction; and,
    the respective first connection points are spaced apart along the straight mounting element.

4. The artificial mangrove assembly of claim 1, wherein:
    the mounting assembly includes:
        a curved mounting element; and,
        at least one connection element for connecting the curved mounting element to the surface; and,
    the respective first connection points are spaced apart along the curved mounting element.

5. The artificial mangrove assembly of claim 1, wherein the respective second connection points are further in the first direction, with respect to the mounting assembly, than the respective first connection points.

6. The artificial mangrove assembly of claim 1, wherein the first root elements are tubular and are aligned in a third direction orthogonal to the first and second directions.

7. The artificial mangrove assembly of claim 1, wherein:
    the plurality of second root elements are tubular and include first and second groups of second root elements;
    second root elements in the first group are aligned in a third direction orthogonal to the first and second directions; and,
    second root elements in the second group are aligned in the third direction and at least partially misaligned with second root elements in the first group in the third direction.

8. The artificial mangrove assembly of claim 1, further comprising a plurality of third root elements, each third root element fixedly secured to a respective second root element at a respective third connection point and including:
    a respective third portion extending downward in the first direction with respect to the respective third connection point;

a respective fourth portion extending outward with respect to the respective third connection point in the second direction; and,
a respective third distal end arranged to contact the bottom of the body of water.

9. The artificial mangrove assembly of claim 8, wherein the respective third connection points are further in the first direction, with respect to the mounting assembly, than the respective second connection points.

10. The artificial mangrove assembly of claim 8, wherein:
the plurality of third root elements are tubular and include first and second groups of third root elements;
third root elements in the first group are aligned in a third direction orthogonal to the first and second directions; and,
third root elements in the second group are aligned in the third direction and at least partially misaligned with third root elements in the first group in the third direction.

11. An artificial mangrove assembly for providing a habitat for aquatic organisms, comprising:
a mounting assembly arranged for attachment to a surface at least partially submerged in a body of water;
a plurality of first tubular root elements, each first tubular root element:
fixedly secured to the mounting assembly at a respective first connection point;
extending downward in a first direction from the respective first connection point; and,
including a respective first distal end arranged to contact a bottom of the body of water;
a plurality of second tubular root elements, each second tubular root element fixedly secured to a respective first tubular root element at a respective second connection point and including:
a respective first portion extending downward in the first direction with respect to the respective second connection point;
a respective second portion extending outward with respect to the respective second connection point in the second direction; and,
a respective second distal end arranged to contact the bottom of the body of water; and,
a plurality of third tubular root elements, each third tubular root element fixedly secured to a respective second tubular root element at a respective third connection point and including:
a respective third portion extending downward in the first direction with respect to the respective third connection point;
a respective fourth portion extending outward with respect to the respective third connection point in the second direction; and,
a respective third distal end arranged to contact the bottom of the body of water, wherein:
the plurality of second root elements include first and second groups of second root elements;
respective second connection points for the first group are further from the mounting assembly in the first direction than respective second connection points for the second group;
the plurality of third root elements include third and fourth groups of third root elements; and,
respective third connection points for the third group are further from the mounting assembly in the first direction than respective third connection points for the fourth group.

12. A method of forming an artificial mangrove assembly for providing a habitat for aquatic organisms, comprising:
attaching a mounting assembly to a surface at least partially submerged in a body of water;
fixedly securing each first root element from a plurality of first root elements to the mounting assembly at a respective first connection point such that:
said each first root element extends downward in a first direction from the respective first connection point; and,
a respective first distal end for said each first root element contacts a bottom of the body of water; and,
fixedly securing each second root element from a plurality of second root elements to a respective first root element at a respective second connection point such that:
a respective first portion extends downward in the first direction with respect to the respective second connection point;
a respective second portion extends outward with respect to the respective second connection point in the second direction; and,
a respective second distal contacts the bottom of the body of water.

13. The method of claim 12, wherein attaching the mounting assembly to the surface includes attaching the mounting assembly to a planar substantially vertical surface, or to a curved substantially vertical surface.

14. The method of claim 12, wherein:
the mounting assembly includes:
a straight mounting element; and,
at least one connection element; and,
attaching the mounting assembly to the surface includes:
connecting the straight mounting element to the surface and positioning the straight mounting element away from the surface in the second direction; and,
spacing the respective first connection points along the straight mounting element.

15. The method of claim 12, further comprising positioning the respective second connection points further in the first direction, with respect to the mounting assembly, than the respective first connection points.

16. The method of claim 12, further comprising aligning the first root elements in a third direction orthogonal to the first and second directions.

17. The method of claim 12, wherein the plurality of second root elements are tubular and include first and second groups of second root elements, the method further comprising:
aligning second root elements in the first group in a third direction orthogonal to the first and second directions;
aligning second root elements in the second group in the third direction; and,
at least partially misaligning the second root elements in the second group with the second root elements in the first group in the third direction.

18. The method of claim 12, further comprising fixedly securing each third root element from a plurality of third root elements to a respective second root element at a respective third connection point such that:
a respective third portion extends downward in the first direction with respect to the respective third connection point;
a respective fourth portion extends outward with respect to the respective third connection point in the second direction; and,
a respective third distal contacts the bottom of the body of water.

19. The method of claim 18, wherein the respective third connection points are further in the first direction, with respect to the mounting assembly, than the respective second connection points.

20. The method of claim 18, wherein the plurality of third root elements are tubular and include first and second groups of third root elements, the method further comprising:
- aligning third root elements in the first group in a third direction orthogonal to the first and second directions;
- aligning third root elements in the second group in the third direction; and,
- at least partially misaligning the third root elements in the second group with the third root elements in the first group in the third direction.

* * * * *